Dec. 26, 1967     R. W. REICH     3,360,703

OSCILLATING ELECTRIC MOTOR

Filed April 2, 1964

INVENTOR
ROBERT WALTER REICH

BY Toulmin & Toulmin

ATTORNEYS

United States Patent Office 3,360,703
Patented Dec. 26, 1967

3,360,703
OSCILLATING ELECTRIC MOTOR
Robert Walter Reich, Merzhauserstr. 143, Freiburg im Breisgau, Germany
Filed Apr. 2, 1964, Ser. No. 356,786
Claims priority, application Germany, Apr. 4, 1963, R 34,863
5 Claims. (Cl. 318—128)

This invention relates to the driving mechanism of an electronic clock.

Some of the prior means for electronically driving clock mechanisms consist of a current source, a transistor, a permanent magnet on one side of a regulator and a second permanent magnet complete in itself on the other side of the regulator and which is placed symmetrically to the zero position. Such a setup also includes a stationary combination of coils with each magnet so that one of two exciter coils is inductively influenced by each one of the two separate magnets on the regulator so that in the coordinated driving coil system, one driving impulse will occur at every half oscillation at the output side of the transistor circuit.

Another type of driving means which is usually used with torsion pendulum clocks and balance wheels consists of a common driving coil which is placed at the zero position of the balance wheel and further consists of one exciter coil on each side of the common driving coil. As the magnet passes over the exciter coil, a driving impulse in the correct direction of flow is created in the common driving coil to drive pendulum or balance wheel.

In the present invention, there is a simplification of the structure of the driving mechanism in that only one coil combination having a driving coil and an exciter coil is used. The magnet structure on the regulator such as a pendulum or balance wheel consists of a combination of three magnets which are magnetized in the direction of the coil axes.

The magnet combination consists of one central magnet pole in the center of the regulator and a magnet pole of the opposite polarity placed on each side of the central pole.

The dimensions between the side magnets and the central pole and that of the exciter and driving coils of the coil combination are so selected that as the central pole leaves the driving coil, one of the side magnets of opposite polarity will enter the sphere of the exciter coil. The related circuitry will then create one driving impulse in the driving coil in such a direction so as to repulse the central pole which was leaving the driving coil and attract the side pole which was approaching the driving coil. The same procedure is repeated on the return movement of the regulator except the other side pole and the central pole are utilized for the driving impulse.

The object of this invention is to provide an improved mechanism for an electrically driven clock.

A further object of this invention is to simplify the construction of the driving mechanism of an electronic clock so as to obtain elegant looking constructions.

A still further object of this invention is to provide for a sudden strong driving impulse for the driving mechanism of an electronic clock so as to observe isochronous operating conditions.

These and other objects and advantages of this invention will become apparent upon reference to the following detailed description and accompanying drawings wherein.

Figure 1:
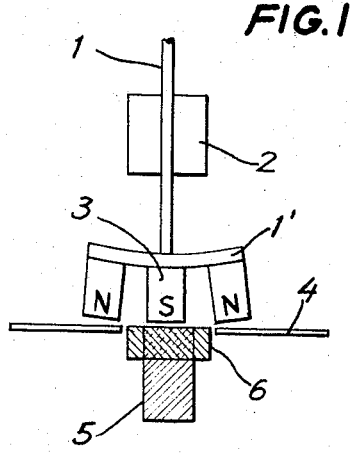
FIGURE 1 is a front view of one embodiment of this invention showing a pendulum type regulator.
Figure 2:
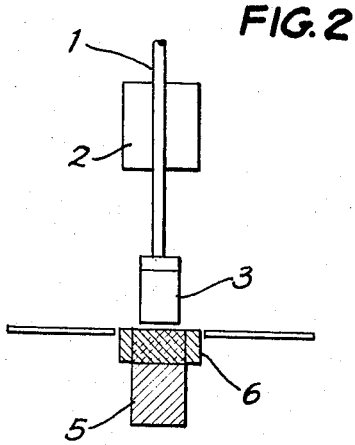
FIGURE 2 is a side view of FIGURE 1.

Referring to the drawings more in detail, FIGURE 1 shows the front view of the first embodiment of this invention. It consists of a pendulum rod 1 which oscillates back and forth and has a known compensator 2 shown schematically thereon.

Fastened to the lower end of the pendulum rod 1, there is an arc shaped segment 1' on to which the magnets generally designated 3 are attached. The segment 1' may be a shunting piece to provide a return path for the magnets. As shown, the magnets are positioned with the south pole of the center magnet being over the driving coil 5 when the pendulum is in the null or zero position shown. On either side of the south magnet pole is a north pole which is spaced somewhat therefrom. The magnets as a rule, are magnetized in the direction of the coil axes and in some instances may be glued onto their supporting structures.

The driving coil 5 is stationarily positioned under the null position of the pendulum and an exciter coil 6 is concentrically placed around the driver coil. A suitable cover plate 4 is shown. The dimensions of the magnets 3 and the coil combination consisting of coils 5 and 6 are so selected that as the south central pole leaves the driving coil 5, one of the north side poles will be entering the exciter coil 6. A suitable impulse is then released from the circuit shown in FIGURE 7 and the impulse enters the driving coil 5 in such a direction that the central south pole is repulsed and the side north pole which was approaching the oscillator coil is attracted to the driving coil. The coils 5 and 6 may be isolated from each other if such is found necessary.

Figure 3:
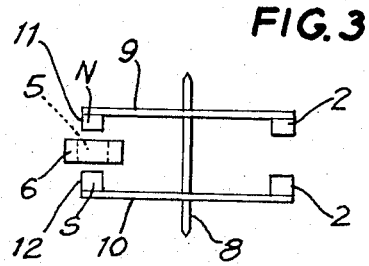
FIGURE 3 is a side view of a second embodiment of this invention showing a balance wheel type construction.
Figure 4:
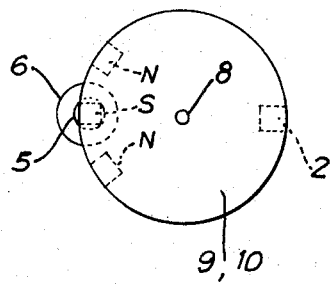
FIGURE 4 is a plan view of FIGURE 3.

This same principle is used in a second embodiment of the invention shown in FIGURES 3 and 4, which show the balance wheel type construction having a wheel axle 8 and upper and lower supports 9 and 10, respectively. The balance wheel is biased by known means such as a spring (not shown) to return it to the zero position.

On the underside of the upper support 9, there are 3 magnetic poles generally designated 11, which are placed with the south pole at the center or null position and a north pole angularly displaced from the south pole on each side thereof.

On the upper side of the lower suport 10 there are 3 magnetic poles generally designated 12 which are positioned with a north pole in the center or null position and a south pole angularly displaced from the north pole on each side thereof.

Between the magnetic poles 11 and 12, the driving coil 5 and the exciter coil 6 are positioned as shown, with the driving coil 5 being positioned at the null position of the balance wheel and the exciter coil. As shown, the coils are placed at the outer periphery of the oscillating balance wheel.

The dimensions of the magnets 11 and 12 and the coils 5 and 6 are so selected so that as the south center pole of upper group 11 and the north center pole of lower group 12 leave the driving coil 5, the adjacent side of poles of groups 11 and 12 are approaching the respective ends of exciter coil 6. At this instant, a driving impulse enters driving coil 5 which repulses the center poles of groups 11 and 12 and attracts the pertaining side poles of the upper and lower pole groups 11 and 12, respectively, which are approaching the exciter coil.

In this type construction in which the coil combination is placed at the outer periphery of the oscillating balance wheel, it is especially effective to employ shaped coils which correspond in their shapes to those of the magnets. The dimensioning of the coils and magnets should be such that the magnets upon the balance wheel should pass completely over the coil combination (and even a little bit further). The excitation created by this kind of oscillation is much greater than the one gotten from an overhanging coil.

However, to improve the construction of the excitation system in overhanging coils, one may construct the exciting coil in the shape of a box having an internal dimension so chosen that magnets with a length of approximately 3 to 4 mm. may swing through the coil. The exciting impulse generated by this action corresponds in magnitude roughly to that generated by a solenoid and magnet.

Here again, it is important to choose the dimensions of the exciter coil and the magnets so that the central magnetic pole leaves the null position when the side pole enters the exciter coil. Because the exciter impulse occurs when a side pole enters the exciter coil, no impeding impulse occurs from the other side pole which is remote from the exciter coil and moving away therefrom.

Figure 5:
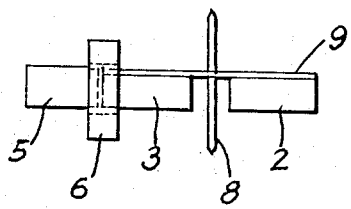
FIGURE 5 is a side view of a third embodiment of this invention showing another modification of the balance wheel type regulator.
Figure 6:
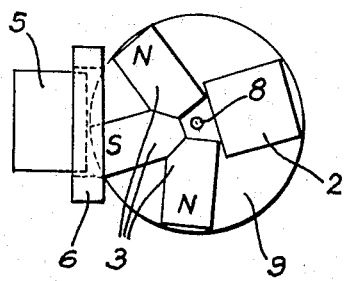
FIGURE 6 is a plan view of FIGURE 5.

FIGURES 5 and 6 show a third modification of this invention which is especially advantageous for small wrist watches or driving movements. In this arrangement the coil combination is placed tangentially of the balance wheel or torsion pendulum. As shown in FIGURE 6, the magnet combination generally designated 3 dips into the coil combination which is generally quadrilateral in shape as shown.

The internal and external dimensions of the exciter coil are so chosen that as the central pole is leaving the exciter coil, the approaching side pole will be entering the exciter coil.

In this arrangement, electromagnets or permanent bar magnets may be used. The magnets are placed along radial lines to the axle 8 of the balance wheel type construction. The magnets are angularly placed on the wheel support 9 so that they form segments of about 90° to 120° and contact one another near the axle 8 to provide a magnetic return path. A magnetic shunting piece (not shown) may also be used to provide a magnetic return path.

The south pole is shown in the center with a north pole on each side thereof and the exciter 6 and driving coil 5 are concentric with each other with the exciter coil being outermost. Of course, the driving coil could be outermost in this arrangement or in the other two modifications if so desired and the magnet poles could also be reversed if desired.

When reversing the coils, the dimensions of the coils and magnets would again have to be selected so that the entering of a side pole and the leaving of the center pole from the null position coincide with each other with respect to time.

In all these modifications, there is only one coil combination necessary which makes for a simplified construction. Because the regulator in the shape of a pendulum, a balance wheel, or a torsion pendulum may swing through the coil combination or swing beyond it (after passing over it) the possibility of elegant-looking constructions is enhanced. The combination of coils can be conveniently placed under the clock plate where it is not noticeable from the outside.

One of the greatest advantages of this type construction over the prior art is the synergistic action produced by the magnets and coils. First of all the exciter coil is under the action of two magnetic poles, whereby the one magnetic pole when it leaves creates a negative impulse and whereby the other magnetic pole simultaneously creates a negative impulse upon entering. At the same time the side pole enters the exciter coil, a driving impulse occurs in the driving coil which repulses the center pole and attracts the side pole which is approaching the exciter coil.

If the coils and magnets are dimensioned so that all the impulses arise at the correct moment of time, a very great increase of the driving pulse will occur. The current used for the modifications of this invention is only one-fifth to one-sixth of that used for clocks and watches which do not employ this principle but which operate with individual poles only for excitation and driving.

Figure 7:
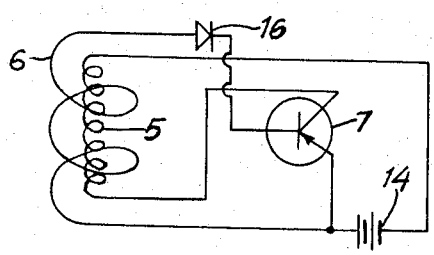
FIGURE 7 is a diagram of the circuit used in conjunction with this invention.

The synergistic addition of the magnetic poles at entering and leaving in this invention leads to a very steep impulse of short duration for opening the transistor shown in FIGURE 7. The sudden opening of the transistor creates a short, sudden, and strong driving impulse which is very important if the oscillating regulator is to observe isochronous operating conditions. This special arrangement of the magnetic poles in combination with correctly dimensioned coils created a surprising effect because the exciter as well as the driving coil show much greater action than was forseeable with respect to the changing magnetic poles.

FIGURE 7 shows the circuit diagram used in this invention. It includes a source of energy 14 in series with the driver coil 5 and connected to the collector-emitter circuit of transistor 7. The exciter coil 6 is connected across the base emitter circuit of the transistor. A suitable diode 16 may be placed in series with the exciter coil as shown to insure that the driving pulse is sent through the driving coil 5 only when a south pole is leaving and a north pole is entering the exciter coil 6.

It will be understood that this invention is susceptible to modification in order to adapt it to different usages and conditions and accordingly, it is desired to comprehend such modifications within this invention as may fall within the scope of the appended claims.

What is claimed is:

1. An electronically operated driving mechanism comprising; a balance wheel having an axle and an upper and lower disc fixed in spaced parallel relation thereon, said balance wheel having a zero position and adapted to be biased toward said zero position, a first plurality of permanent magnets mounted on the perimeter of said upper disc and comprising a central magnet mounted on the perimeter at said zero position and a side magnet on each side of said center pole and spaced therefrom in the peripheral direction of said wheel, a second plurality of permanent magnets mounted on the perimeter of said lower disc and comprising a central magnet mounted on the perimeter of said zero position and a side magnet on each side of said center pole and spaced therefrom, the center magnets of said first and second plurality of magnets establishing a central axial magnetic field in one direction therebetween and the side magnets of the respective discs establishing side axial magnetic fields therebetween in the opposite direction, a coil combination comprising coaxial driver and exciter coils stationarily mounted at said zero position between the perimeters of said upper and lower discs, and circuit means interconnecting said driver and exciter coils, said coil combination and said first and second plurality of magnets being dimensioned and positioned to generate an impulse in said exciter coil as the said magnetic field is passing through one side of said exciter coil and is receding from the axis of said coils and the pertaining side magnetic field of said first and second plurality is passing through the other side of said exciter coil and is approaching said coil axis, said impulse generated in said exciter coil being effective through said circuit means to create a driving impulse in said driving coil which will repulse said central magnets and attract the said pertaining side magnets which are approaching said coil axis to drive said balance wheel.

2. The mechanism as claimed in claim 1 in which said driver coil is concentrically positioned inside said exciter coil.

3. An electronically operated driving mechanism comprising; a balance wheel having an axle and a disc fixed on said axle to rotate therewith, said wheel also having a zero position and adapted to be biased toward said zero position, a plurality of permanent magnets mounted on said disc along radial lines and comprising a central magnet mounted on the perimeter of said disc at said zero position and a side magnet mounted on said perimeter on each side of said central pole and angularly spaced therefrom in the circumferential direction of said wheel, a coil combination comprising a driver and an exciter coil stationarily mounted in coaxial relation adjacent the periphery of said wheel at the said zero position, the axis of said coils extending radially of said wheel and the periphery of said wheel extending into at least a portion of said coil combination, and circuit means interconnecting said driver and exciter coils, said coil combination and said plurality of permanent magnets being dimensioned and positioned to generate an impulse in said exciter coil as the said central magnet is adjacent one side of said exciter coils and is receding from the axis of said coils and one of said side magnets is adjacent the other side of said exciter coil and is approaching said axis, said impulse generated in said exciter coil being effective through said circuit means to create a driving impulse in said driving coil which will repulse said central magnet and attract said side magnet which is approaching said coil axis, said driver and exciter coils being generally quadrilateral in shape and having two legs extending in the direction of movement of said wheel and two other legs extending substantially at right angles thereto and said driver coil being concentrically positioned inside said exciter coil, said side magnets and said central magnet being so spaced that the distance between a said side magnet and the central magnet corresponds substantially to the distance between the said two other legs of said exciter coil so that as said central magnet is leaving said exciter coil and is adjacent one of said other legs, the approaching side magnet will be adjacent the other of said other legs and will be entering the exciter coil.

4. The mechanism as claimed in claim 3 in which magnetic shunt means are provided for said plurality of magnets to provide a return path for said magnets.

5. The apparatus as claimed in claim 3 in which said circuit means comprises, a source of energy, and a transistor, said driving coil being in series with said source of energy and connected in the collector-emitter circuit of said transistor and said exciter coil being connected to the base-emitter circuit of said transistor, and a diode in series with said exciter coil.

References Cited
UNITED STATES PATENTS

| | | | |
|---|---|---|---|
| 3,156,857 | 11/1964 | Herr et al. | 318—132 |
| 3,095,528 | 6/1963 | Dome | 318—132 |
| 3,046,460 | 7/1962 | Zemla | 318—132 |
| 3,124,730 | 3/1964 | Thoma | 318—132 X |
| 3,184,623 | 5/1965 | Marti et al. | 310—36 |

MILTON O. HIRSHFIELD, *Primary Examiner.*

D. F. DUGGAN, *Assistant Examiner.*